United States Patent
Zhao et al.

(10) Patent No.: US 11,994,603 B1
(45) Date of Patent: May 28, 2024

(54) METHOD OF SPARSE ARRAY ORIENTED APPROACH FOR DOA ESTIMATION OF GRATING LOBE TARGET FILTERING

(71) Applicant: SHANGHAI GEOMETRICAL PERCEPTION AND LEARNING CO., LTD., Shanghai (CN)

(72) Inventors: Yue Zhao, Shanghai (CN); Mingyu Zhou, Shanghai (CN); Songhua Shi, Shanghai (CN); Dan Xue, Shanghai (CN)

(73) Assignee: SHANGHAI GEOMETRICAL PERCEPTION AND LEARNING CO., LTD., Shanghai (CN)

( * ) Notice: Subject to any disclaimer, the term of this patent is extended or adjusted under 35 U.S.C. 154(b) by 0 days.

(21) Appl. No.: 18/381,453

(22) Filed: Oct. 18, 2023

(30) Foreign Application Priority Data

Feb. 20, 2023 (CN) .......................... 202310134802.0

(51) Int. Cl.
  *G01S 3/14* (2006.01)
(52) U.S. Cl.
  CPC .................................. *G01S 3/143* (2013.01)
(58) Field of Classification Search
  None
  See application file for complete search history.

(56) References Cited

U.S. PATENT DOCUMENTS

2021/0190911 A1   6/2021  Isoda

FOREIGN PATENT DOCUMENTS

| CN | 105334508 A | 2/2016 |
| CN | 107121665 A | 9/2017 |

(Continued)

OTHER PUBLICATIONS

Song Hu,"Digital Array Radar Antidisturbance Key Technology Research Key Technology Research on Digital Array Radar Antidisturbance", China Doctoral Dissertation Full Text Data Engineering Science and Technology II , Jan. 15, 2023 pp. C032-18.

(Continued)

*Primary Examiner* — Whitney Moore
(74) *Attorney, Agent, or Firm* — MUNCY, GEISSLER, OLDS & LOWE, PC (57) ABSTRACT

A method of sparse array oriented approach for DOA estimation of grating lobe target filtering includes sub-array division processing of received echoes in multiple channels; digital beamforming is performed on each sub-array obtained after division to realize DOA estimation; the echo power of the beam pointing at each angle is calculated and the peak point is detected; peak threshold discrimination processing is performed based on the determined peak threshold; if the current sub-array satisfies the identified peak threshold, the corresponding power spectrum extreme is calculated to obtain the final DOA estimation. The present invention also relates to a corresponding device, processor and computer-readable storage medium thereof. With the use of this sparse array oriented method, device, processor and computer-readable storage medium for implementing filtered DOA estimation of a gate lobe target, the interference of the gate target is effectively avoided by dividing the subarray and binarizing the angular power spectrum.

6 Claims, 5 Drawing Sheets

(56) References Cited

FOREIGN PATENT DOCUMENTS

| | | | | |
|---|---|---|---|---|
| CN | 108710103 | A | 10/2018 | |
| CN | 111679266 | A | 9/2020 | |
| CN | 113376569 | A | 9/2021 | |
| CN | 113835068 | A | 12/2021 | |
| CN | 114696116 | A | 7/2022 | |
| EP | 3588128 | A1 * | 1/2020 | ......... G01S 13/9004 |
| EP | 3690483 | A1 * | 8/2020 | ........... G01S 13/003 |
| WO | 2019195426 | A1 | 10/2019 | |

OTHER PUBLICATIONS

Luo Xu et al."Sparse Reconstruction Based on Tanimoto Coefficient for DOA Estimation in Compressed Sensing", 2022 IEEE 10th International Conference on Information, Communication and Networks (ICICN) Jan. 12, 2023 pp. 444-448.

* cited by examiner

Sub-array 1 direction map

Sub-array 2 direction map

Sub-array 3 direction map

Sub-array 4 direction map

METHOD OF SPARSE ARRAY ORIENTED APPROACH FOR DOA ESTIMATION OF GRATING LOBE TARGET FILTERING

CROSS REFERENCE TO RELATED APPLICATIONS

This application claims priority of Application No. CN 202310134802.0 filed in China on Feb. 20, 2023 under 35 U.S.C. § 119, the entire contents of which is hereby incorporated by reference.

FIELD OF TECHNOLOGY

The present invention relates to the technical field of array antennas, in particular to the technical field of array antennas with sparse layouts, specifically, it refers to a method, device, processor, and computer-readable storage medium of sparse array oriented approach for DOA estimation of grating lobe target filtering.

DESCRIPTION OF RELATED ARTS

The antenna is the basic unit for transmitting and receiving radar signals, and the angular resolution of radar is determined by the aperture of the antenna array, and the larger the aperture, the higher the resolution, with the increasing demand for radar super-resolution imaging in automotive, transportation, and other applications, the requirement for angular resolution has increased, requiring antenna apertures to be as large as possible. Conventional array antennas are often homogeneous line or surface arrays, where the need for large aperture, if the array antenna is uniformly distributed, it will lead to a great increase in radar size and production cost. In this regard, it is necessary to consider the use of non-uniformly sparse arrays in order to overcome, as far as possible, the problem of the above-mentioned shortcomings.

However, for sparsely laid out array antennas, due to the large spacing of the array elements, grating lobe will be generated in their directional maps, the presence of grating lobe causes targets to enter through the lobes during beam scanning, resulting in grating false targets, which ultimately affects the accuracy of the Direction Of Arrival (DOA) estimation. To avoid grating lobe targets, the angular search can be limited to its angular unambiguous range, the required goniometric range in practical application scenarios usually exceeds the unambiguous goniometric range of sparse arrays, therefore how to satisfy the actual demand of the angular measurement range to filter out the false targets entered by the grating lobe and ensure the correctness of the angle estimation is an urgent problem in the DOA estimation of sparse arrays.

SUMMARY OF THE INVENTION

It is an object of the present invention to overcome the drawbacks of the above mentioned prior art, and to provide a method, device, processor, and computer-readable storage medium of sparse array oriented approach for DOA estimation of grating lobe target filtering.

In order to achieve the above objectives, the method, device, processor, and computer-readable storage medium of sparse array oriented approach for DOA estimation of grating lobe target filtering are as follows:

The method of sparse array oriented approach for DOA estimation of grating lobe target filtering, the main feature of which is that the said method comprises following steps:
(1) sub-array division processing of received echoes in multiple channels;
(2) digital beamforming is performed on each sub-array obtained after division to realize DOA estimation;
(3) the echo power of the beam pointing at each angle is calculated and the peak point is detected;
(4) peak threshold discrimination processing is performed based on the determined peak threshold;
(5) if the current sub-array satisfies the identified peak threshold then the corresponding power spectrum extreme is calculated to obtain the final DOA estimation.

Preferably, the said step (1) specifically comprises:
(1.1) act as a unit of row, sub-array division in the azimuthal dimension;
(1.2) the received echoes of each array element are modeled and the echoes of each channel are represented using the following equations:

$$S_r = [S_{r_1}\ S_{r_2}\ \ldots\ S_{r_N}]$$

where the $S_{r_n}$ denotes each receiving channel echo, (n=1, 2 ... N), and the N is the number of receiving channels;
(1.3) the received echoes in each channel are processed for wave path-difference cancellation and phase compensation is performed using a steering vector for digital beam formation, where the two-dimensional guiding vector is expressed using the following equation:

$$\alpha(\theta, \varphi) = [1,\ e^{-j2\pi\phi_1(\theta,\ \varphi)},\ \ldots,\ e^{-j2\pi\phi_N(\theta,\ \varphi)}]$$

where the $\phi_{n(\theta,\ \varphi)}$ denotes the phase difference between the nth channel and the reference channel, (n=1, 2 ... N), the phase difference also includes azimuthal phase difference $\phi_{n_{azim}}$ and pitch phase difference $\phi_{n_{elev}}$, as follows:

$$\phi_n(\theta, \varphi) = \phi_{n_{elev}} + \phi_{n_{azim}}$$

$$\phi_{n_{azim}}(\theta, \varphi) = \frac{\Delta d_{n_x} \cos\varphi \sin\theta}{\lambda}$$

$$\phi_{n_{elev}}(\varphi) = \frac{\Delta d_{n_y} \sin\varphi}{\lambda}$$

where the $\Delta d_{n_x}$ denotes the azimuthal distance between the nth channel and the reference channel, the $\Delta d_{n_y}$ denotes the pitching direction distance between the nth channel and the reference channel, the denotes the wavelength, $\theta$ denotes the azimuth angle, and $\varphi$ denotes the pitch angle;
(1.4) complete the subarray division process.

Preferably, the said step (2) specifically comprises:
(2.1) since $\Delta d_{n_y}=0$ within each row of the sub-array, the pitch direction phase difference at this point is:

$$\phi_{n_{elev}}(\varphi) = 0$$

where the $\phi_{n_{elev}}(\varphi)$ denotes the pitch direction phase difference between the nth channel and the reference channel when the target pitch angle is $\varphi$;

(2.2) the phase difference between the n channels and the reference channel is calculated to accomplish the DOA estimation, using the following equation to calculate the phase difference:

$$\phi_n(\theta, \varphi) = \phi_{n_{azim}}(\theta) = \phi_n(\theta)$$

where the $\phi_{n_{azim}}(\theta)$ denotes the azimuthal phase difference between the nth channel and the reference channel when the target azimuth is $\theta$.

Preferably, the said step (3) specifically comprises:

(3.1) the steering vector is multiplied by the each channel echoes to obtain the echo power of the digital beam pointing at each angle, specifically as calculated using the following equation:

$$p_i(\theta) = \alpha^H(\theta) S_r S_r^H \alpha(\theta)$$

where the i denotes the ith subarray, $p_i(\theta)$ denotes the power spectrum of the ith subarray, $\alpha^H(\theta)$ denotes the steering vector at an azimuthal angle of $\theta$, the $S_r$ denotes the echo vector, and $S_r^H$ is the conjugate transpose of $S_r$;

(3.2) the power spectrum of each sub-array is normalized and logarithmized according to the following equation in order to calculate the angular power spectrum maximum and thus determine the peak threshold thr:

$$p_{i_{norm}}(\theta) = 10 \log_{10} \frac{p_i(\theta)}{\max[p_i(\theta)]}$$

where the $p_{i_{norm}}(\theta)$ denotes power spectrum after normalization of the ith subarray;

once the normalized power spectrum is complete, ½ of the power maximum is used to determine the peak threshold thr;

(3.3) peak point detection of the normalized spectrogram $p_{i_{norm}}(\theta)$ for each sub-array, retain the power $p_{i_{norm}}(\theta_{peak})$ at all peak points $\theta_{peak}$.

Preferably, the said step (4) specifically comprises:

setting the angular power greater than or equal to said peak threshold thr to 1 and the angular power less than said peak threshold thr to 0, specifically:

$$p_{i_{binary}}(\theta) = \begin{cases} 1 & p_{i_{norm}}(\theta_{peak}) \geq thr \\ 0 & p_{i_{norm}}(\theta_{peak}) < thr \end{cases}$$

where the $p_{i_{binary}}(\theta_{peak})$ denotes the binary spectrogram of the ith sub-array.

Preferably, the said step (5) specifically comprises:

(5.1) the binarized power spectrum of each sub-array set to 1 is dot-multiplied as follows:

$$p_{binary}(\theta) = \prod_i p_{i_{binary}}(\theta)$$

where the $p_{binary}(\theta)$ denotes the total power spectrum after dot-multiplication of the binarized power spectra of all sub-arrays;

(5.2) the raw power spectrum $p_{i_{norm}}(\theta)$ of the sub-array with the highest number of array elements is selected, and multiply it with the binarized power spectrum after dot-multiplied to obtain the target angular position and echo power as:

$$p(\theta) = p_{i_{norm}}(\theta) \cdot p_{binary}(\theta)$$

where the p($\theta$) denotes the final power spectrum;

(5.3) peak point detection for the final power spectrum p($\theta$), the $\theta$ corresponding to the location of the peak point is used as the DOA estimation output.

The device of sparse array oriented approach for DOA estimation of grating lobe target filtering, the main feature of which is that the said device comprises:

processor, configured to execute computer-executable instructions;

memory, storing one or more computer-executable instructions, when the said computer-executable instructions are executed by the said processor, various steps for realizing the method of sparse array oriented approach for DOA estimation of grating lobe target filtering as claimed in above-described.

The processor of sparse array oriented approach for DOA estimation of grating lobe target filtering, the main feature of which is that the processor being configured to execute computer-executable instructions, when the said processor being configured to execute computer-executable instructions, various steps for realizing the method of sparse array oriented approach for DOA estimation of grating lobe target filtering as claimed in above-described.

The computer-readable storage medium, the main feature of which is that the said computer program may be executed by a processor to implement the various steps for realizing the method of sparse array oriented approach for DOA estimation of grating lobe target filtering as claimed in above-described.

With the use of this method, device, processor, and computer-readable storage medium of sparse array oriented approach for DOA estimation of grating lobe target filtering of the present invention, by dividing the sub-array and binarizing the angular power spectrum, the interference of grating targets is effectively avoided, and this technical solution can still ensure the accuracy of angle estimation in multi-target scenarios, compared to the conventional method of estimating the angle of a face array, this technical solution reduces the computation of angle searching, facilitates hardware implementation, and has more prominent utility.

DETAILED DESCRIPTION OF THE PREFERRED EMBODIMENT

In order to be able to understand the technical content of the present invention more clearly, is further exemplified by the following detailed description of embodiments.

Before describing in detail the embodiments according to the present invention, it should be noted that, in the following, the terms "including", "comprising" or any other variant are intended to cover non-exclusive inclusion, so that a processes, methods, goods, or equipment comprising a set of elements contains more than just those elements, and it also contains other elements that are not explicitly listed or that are inherent to such processes, methods, goods, or equipment.

Figure 1:
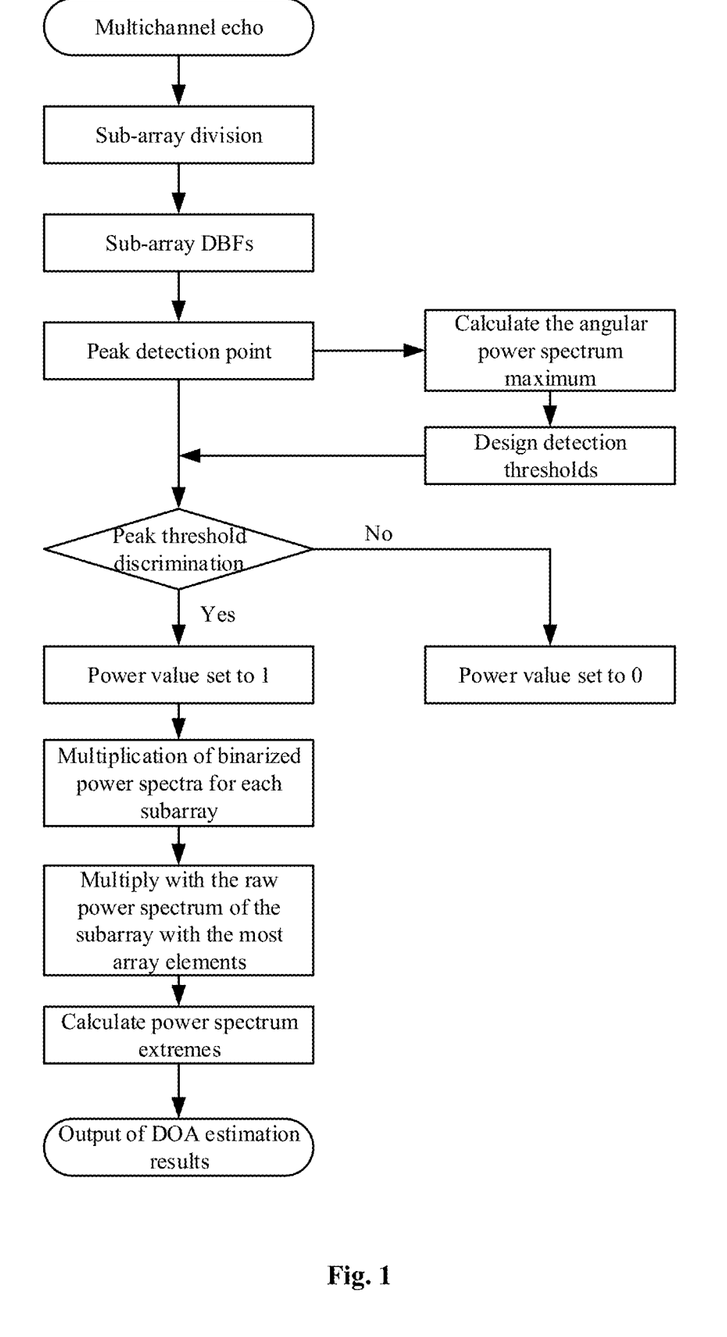
FIG. 1 shows a flowchart of the sparse array oriented method of the present invention for realizing DOA estimation for grating lobe filtering.

Referring to FIG. 1, which shows that the method of sparse array oriented approach for DOA estimation of grating lobe target filtering, wherein the said method comprises following steps:

(1) sub-array division processing of received echoes in multiple channels;

(2) digital beamforming is performed on each sub-array obtained after division to realize DOA estimation;

(3) the echo power of the beam pointing at each angle is calculated and the peak point is detected;

(4) peak threshold discrimination processing is performed based on the determined peak threshold;

(5) if the current sub-array satisfies the identified peak threshold then the corresponding power spectrum extreme is calculated to obtain the final DOA estimation.

As a preferred embodiment of the present invention, the said step (1) specifically comprises:

(1.1) act as a unit of row, sub-array division in the azimuthal dimension;

(1.2) the received echoes of each array element are modeled and the echoes of each channel are represented using the following equations:

$$S_r = [S_{r_1}\ S_{r_2} \ldots S_{r_N}]$$

where the $S_{r_n}$ denotes each receiving channel echo, (n=1, 2 ... N), and the N is the number of receiving channels;

In order to cancel such phase difference, phase compensation is performed using a steering vector for digital beam formation as follows: (1.3) the received echoes in each channel are processed for wave path-difference cancellation and phase compensation is performed using a steering vector for digital beam formation, where the two-dimensional guiding vector is expressed using the following equation:

$$\alpha(\theta, \varphi) = [1,\ e^{-j2\pi\phi_1(\theta,\ \varphi)},\ \ldots,\ e^{-j2\pi\phi_N(\theta,\ \varphi)}]$$

where the $\phi_{n(\theta,\ \varphi)}$ denotes the phase difference between the nth channel and the reference channel, (n=1, 2 ... N), the phase difference also includes azimuthal phase difference $\phi_{n_{azim}}$ and pitch phase difference $\phi_{n_{elev}}$, as follows:

$$\phi_n(\theta,\ \varphi) = \phi_{n_{elev}} + \phi_{n_{azim}}$$

$$\phi_{n_{azim}}(\theta, \varphi) = \frac{\Delta d_{n_x} \cos\varphi \sin\theta}{\lambda}$$

$$\phi_{n_{elev}}(\varphi) = \frac{\Delta d_{n_y} \sin\varphi}{\lambda}$$

where the $\Delta d_{n_x}$ denotes the azimuthal distance between the nth channel and the reference channel, the $\Delta d_{n_y}$ denotes the pitching direction distance between the nth channel and the reference channel, the denotes the wavelength, $\theta$ denotes the azimuth angle, and $\varphi$ denotes the pitch angle;

(1.4) complete the subarray division process.

As a preferred embodiment of the present invention, the said step (2) specifically comprises:

Digital Beam Form (DBF) is performed on each sub-array to realize DOA estimation, since $\Delta d_{n_y}=0$ within each row of the sub-array, therefore:

(2.1) since $\Delta d_{n_y}=0$ within each row of the sub-array, the pitch direction phase difference at this point is:

$$\phi_{n_{elev}}(\varphi)=0$$

where the $\phi_{n_{elev}}(\varphi)$ denotes the pitch direction phase difference between the nth channel and the reference channel when the target pitch angle is $\varphi$;

(2.2) the phase difference between the n channels and the reference channel is calculated to accomplish the DOA estimation, using the following equation to calculate the phase difference:

$$\phi_n(\theta,\ \varphi) = \phi_{n_{azim}}(\theta) = \phi_n(\theta)$$

where the $\phi_{n_{azim}}(\theta)$ denotes the azimuthal phase difference between the nth channel and the reference channel when the target azimuth is $\theta$.

As a preferred embodiment of the present invention, the said step (3) specifically comprises:

(3.1) the steering vector is multiplied by the each channel echoes to obtain the echo power of the digital beam pointing at each angle, specifically as calculated using the following equation:

$$p_i(\theta) = \alpha^H(\theta) S_r S_r^H \alpha(\theta)$$

where the i denotes the ith subarray, $p_i(\theta)$ denotes the power spectrum of the ith subarray, $\alpha^H(\theta)$ denotes the steering vector at an azimuthal angle of $\theta$, the $S_r$ denotes the echo vector, and $S_r^H$ is the conjugate transpose of $S_r$;

(3.2) the power spectrum of each sub-array is normalized and logarithmized according to the following equation in order to calculate the angular power spectrum maximum and thus determine the peak threshold thr:

$$p_{i_{norm}}(\theta) = 10\log_{10}\frac{p_i(\theta)}{\max[p_i(\theta)]}$$

where the $p_{i_{norm}}(\theta)$ denotes power spectrum after normalization of the ith subarray;

once the normalized power spectrum is complete, ½ of the power maximum is usually used to determine the corresponding normalized logarithm of peak threshold:

$$\text{thr} = -3$$

(3.3) peak point detection of the normalized spectrogram $p_{i_{norm}}(\theta)$ for each sub-array, retain the power $p_{i_{norm}}(\theta_{peak})$ at all peak points $\theta_{peak}$.

As a preferred embodiment of the present invention, the said step (4) specifically comprises:

setting the angular power greater than or equal to said peak threshold thr to 1 and the angular power less than said peak threshold thr to 0, specifically:

$$p_{i_{binary}}(\theta) = \begin{cases} 1 & p_{i_{norm}}(\theta_{peak}) \geq thr \\ 0 & p_{i_{norm}}(\theta_{peak}) < thr \end{cases}$$

where the $p_{i_{binary}}(\theta)$ denotes the binary spectrogram of the ith sub-array.

As a preferred embodiment of the present invention, the said step (5) specifically comprises:

(5.1) the binarized power spectrum of each sub-array set to 1 is dot-multiplied as follows:

$$p_{binary}(\theta) = \prod_i p_{i_{binary}}(\theta)$$

where the $p_{binary}(\theta)$ denotes the total power spectrum after dot-multiplication of the binarized power spectra of all sub-arrays;

Since each sub-array has a different grid position, the angle of the pseudo-targets entering by the grid is also different, and each sub-array can create peaks in the power spectrum for real targets, thus the grid pseudo-targets for each sub-array can be filtered out by dot products, while retaining the true target position.

(5.2) the raw power spectrum $p_{i_{norm}}(\theta)$ of the sub-array with the highest number of array elements is selected, and multiply it with the binarized power spectrum after dot-multiplied to obtain the target angular position and echo power as:

$$p(\theta) = p_{i_{norm}}(\theta) \cdot p_{binary}(\theta)$$

where the $p(\theta)$ denotes the final power spectrum;

(5.3) peak point detection for the final power spectrum $p(\theta)$, the $\theta$ corresponding to the location of the peak point is used as the DOA estimation output.

As shown in FIG. 1, the present invention's proposes a method of sparse array oriented approach for DOA estimation of grating lobe target filtering, by dividing the sub-arrays into separate DBFs and binarizing the angular power spectra, reduces the negative impact of grating lobe entry targets on DOA results, while reducing the computational effort of 2D DOA estimation.

Figure 2:
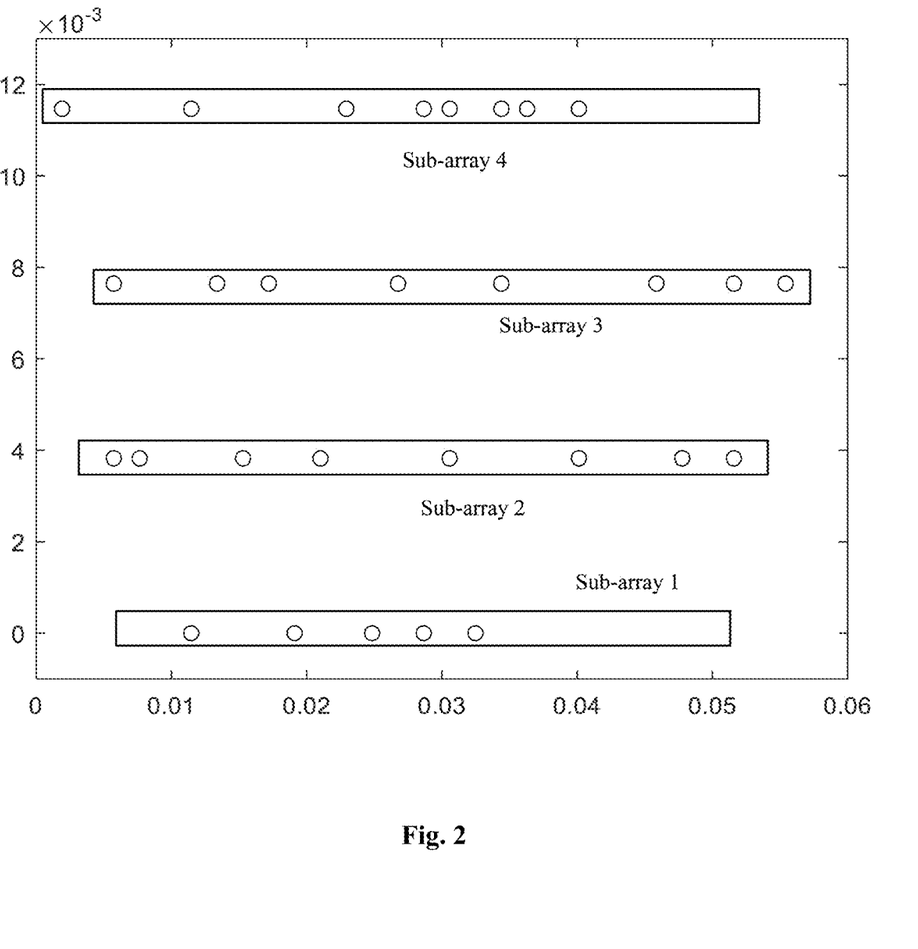
FIG. 2 shows a schematic diagram of the sparse face array distribution of the present invention.

As a preferred embodiment of the present invention, the sparse array selected for the experiment is shown in FIG. 2, and the array exhibits high sparsity in both azimuthal and pitch directions. Its echo can be expressed as:

$$S_r = [S_{r_1} S_{r_2} \ldots S_{r_N}] \quad (1)$$

where the $S_{r_n}$ (n=1, 2 ... N) denotes the echo of the nth received channel.

As a preferred embodiment of the present invention, the present invention divides the two-dimensional sparse array of FIG. 2 into four sub-arrays on a row-by-row basis, with no pitch phase difference within the sub-arrays, thus the azimuthal phase difference of each receive channel within each sub-array with respect to the reference channel can be expressed as:

$$\phi_n(\theta) = \phi_{n_{azim}}(\theta) = \frac{\Delta d_{n_x} \cos\varphi \sin\theta}{\lambda} \quad (2)$$

where the $\theta$ denotes the azimuth angle, and $\varphi$ denotes the pitch angle, $\Delta d_{n_x}$ is the azimuthal distance of the nth array element relative to the reference channel within each sub-array, $\lambda$ denotes the wavelength.

Figure 3:
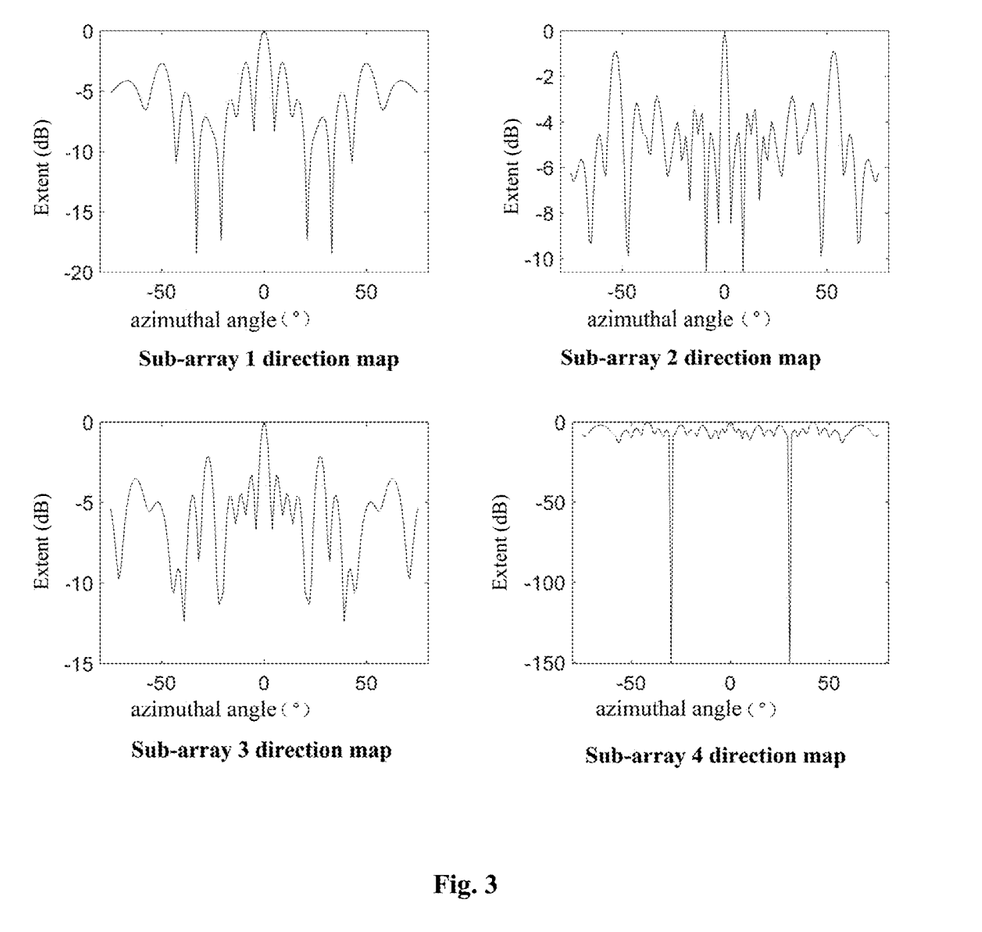
FIG. 3 shows an orientation diagram of the sub-arrays of the present invention.

As a preferred embodiment of the present invention, the orientation map of each sub-array is shown in FIG. 3, from which it can be seen that the array is relatively sparse, resulting in a higher orientation map gate, and the gate lobe of each sub-array is distributed at different angular positions.

As a preferred embodiment of the present invention, the realization of digital beam forming is carried out within each sub-array and the guiding vector can be expressed as:

$$\alpha(\theta) = [1, e^{-j2\pi\phi_1(\theta)}, \ldots, e^{-j2\pi\phi_n(\theta)}] \quad (4)$$

where the $\phi_n(\theta)$ denotes the phase difference between the each channel and the reference channel.

As a preferred embodiment of the present invention, for each sub-array, multiply the guidance vector $\alpha(\theta)$ with each channel echo within the sub-array. The echo power of the beam pointing at each angle is obtained:

$$p_i(\theta) = \alpha^H(\theta) S_r S_r^H \alpha(\theta) \quad (5)$$

where the i denotes the ith subarray, $p_i(\theta)$ denotes the power spectrum of the ith sub-array, $\alpha^H(\theta)$ denotes the steering vector at an azimuthal angle of $\theta$, the $S_r$ denotes the echo vector, and $S_r^H$ is the conjugate transpose of $S_r$;

As a preferred embodiment of the present invention, after obtaining $p_i(\theta)$, it is normalized to take the logarithm:

$$p_{i_{norm}}(\theta) = 10\log_{10} \frac{p_i(\theta)}{\max[p_i(\theta)]} \quad (6)$$

where the $p_{i_{norm}}(\theta)$ denotes power spectrum after normalization of the ith sub-array.

As a preferred embodiment of the present invention, determine the peak threshold thr, which is set to −3 dB in the implementation.

As a preferred embodiment of the present invention, peak point detection of the normalized power spectrum $p_{i_{norm}}(\theta)$ for each sub-array, retaining the power $p_{i_{norm}}(\theta_{peak})$ at all peak points $\theta_{peak}$, and set the power spectrum $p_{i_{norm}}(\theta)$ corresponding to the non-peak point angle $\theta_{peak}$ to 0.

As a preferred embodiment of the present invention, set the angular power greater than the threshold to 1 and vice versa to 0:

$$p_{i_{binary}}(\theta) = \begin{cases} 1 & p_{i_{norm}}(\theta_{peak}) \geq thr \\ 0 & p_{i_{norm}}(\theta_{peak}) < thr \end{cases} \quad (7)$$

where the $p_{i_{binary}}(\theta)$ denotes the binary spectrogram of the ith sub-array.

As a preferred embodiment of the present invention, after binarizing the power spectra, the binarized power spectra of each sub-array are dot-multiplied:

$$p_{binary}(\theta) = \prod_i p_{i_{binary}}(\theta) \quad (8)$$

where the $p_{binary}(\theta)$ denotes the total power spectrum after dot-multiplication of the binarized power spectra of all sub-arrays.

As a preferred embodiment of the present invention, after dot-multiplying the binarized power spectrum, the original power spectrum of the sub-array with the highest number of array elements $p_{i_{norm}}(\theta)$, is selected and multiplied with the binarized power spectrum after dot-multiplying, selected sub-array 2 orientation map in the embodiment:

$$p(\theta) = p_{i_{norm}}(\theta) \cdot p_{binary}(\theta) \quad (9)$$

obtain the target angular position and echo power, where $p(\theta)$ denotes the final power spectrum.

As a preferred embodiment of the present invention, peak point detection is performed for p(θ), and the θ corresponding to the location of the peak point is output as the azimuthal dimension DOA estimation result.

Figure 4:
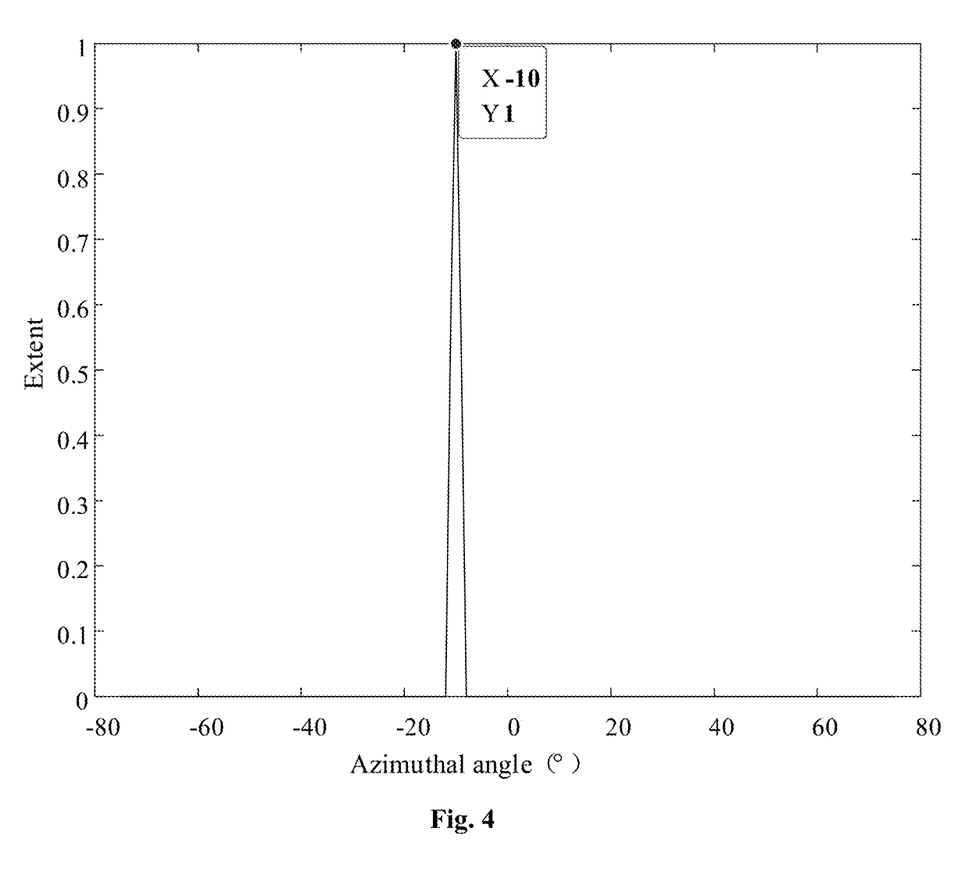
FIG. 4 shows a schematic representation of the single-target DOA estimation results of the present invention.

As a preferred embodiment of the present invention, set simulation target azimuth to −10°, the DOA results of the present invention are shown in FIG. 4, where the angular spectrum is peaked only at the location of the target, and the return power in the direction of the gate is removed by multiplying the binarized power spectrum.

Figure 5:
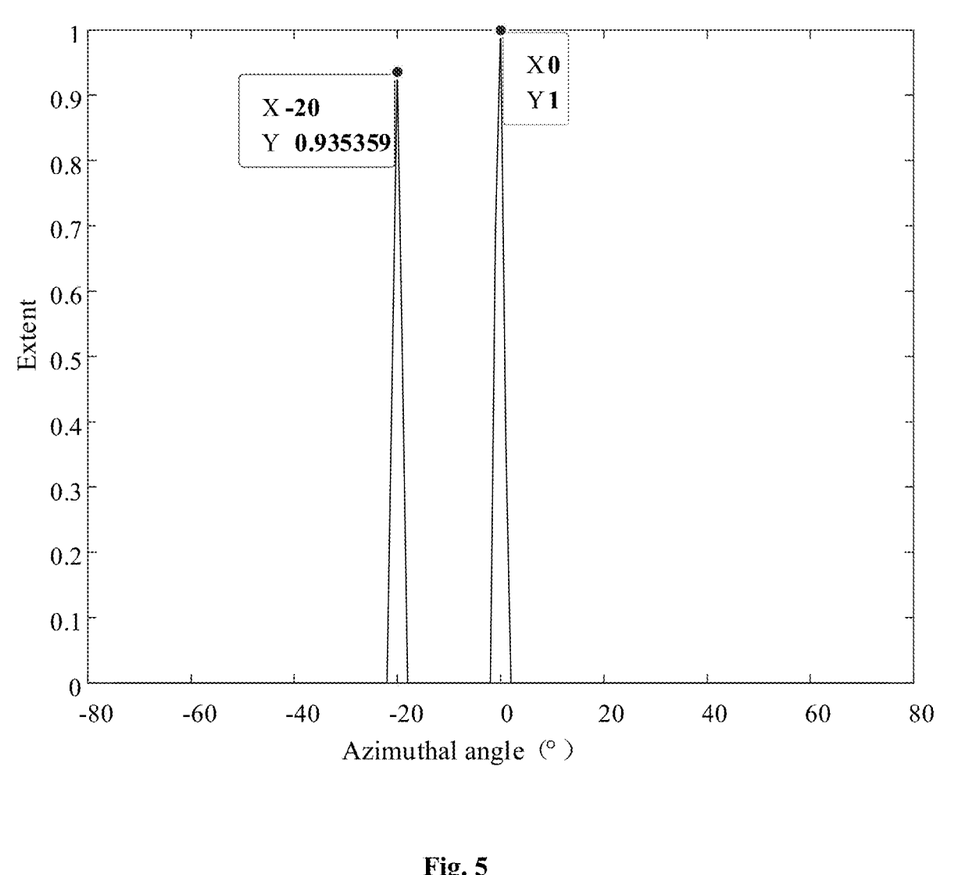
FIG. 5 shows a schematic representation of the multi-target DOA estimation results of the present invention.

As a preferred embodiment of the present invention, setting up a multi-target scene with target azimuths of −20° and 0°, the DOA estimation results are shown in FIG. 5, which accurately detects two targets with no gate interference.

The device of sparse array oriented approach for DOA estimation of grating lobe target filtering, wherein, the said device comprises:
processor, configured to execute computer-executable instructions;
memory, storing one or more computer-executable instructions, when the said computer-executable instructions are executed by the said processor, various steps for realizing the method of sparse array oriented approach for DOA estimation of grating lobe target filtering as claimed in above-described.

The processor of sparse array oriented approach for DOA estimation of grating lobe target filtering, wherein, the processor being configured to execute computer-executable instructions, when the said processor being configured to execute computer-executable instructions, various steps for realizing the method of sparse array oriented approach for DOA estimation of grating lobe target filtering as claimed in above-described.

The computer-readable storage medium, wherein, the said computer program may be executed by a processor to implement the various steps for realizing the method of sparse array oriented approach for DOA estimation of grating lobe target filtering as claimed in above-described.

Any process or method description depicted in the flowchart or otherwise described herein may be understood to represent a module, fragment, or portion of code comprising one or more executable instructions for implementing the steps of a particular logical function or process, and that the scope of the preferred embodiments of the present invention includes additional implementations, which may be, in no particular order as shown or discussed, including performing functions in a substantially simultaneous manner or in reverse order, according to the functions involved, should be understood by those skilled in the art to which embodiments of the present invention belong.

It should be understood that various parts of the invention may be implemented with hardware, software, firmware, or combinations thereof. In the above embodiments, a plurality of steps or methods may be implemented with software or firmware stored in memory and executed by a suitable instruction execution device.

One of ordinary skill in the art can appreciate that all or some of the steps carried out to realize the method of the above embodiments can be accomplished by instructing the associated hardware by means of a program, which can be stored in a computer-readable storage medium that, when executed, comprises one of the steps of the method embodiments or a combination thereof.

The storage media mentioned above may be read-only memories, disks or CD, etc.

In the description of this specification, reference to the terms "an embodiment", "some embodiments", "example", "specific example", or "embodiment" means that a specific feature, structure, material, or characteristic described in conjunction with the embodiment or example is included in at least one embodiment or example of the present invention. In this specification, schematic representations of the above terms do not necessarily refer to the same embodiments or examples. Moreover, specific features, structures, materials, or characteristics described may be combined in any one or more embodiments or examples in a suitable manner.

Although embodiments of the present invention have been shown and described above, it is to be understood that the above embodiments are exemplary and are not to be construed as a limitation of the present invention, and that one of ordinary skill in the art may make changes, modifications, substitutions, and variations of the above embodiments within the scope of the present invention.

With the use of this method, device, processor, and computer-readable storage medium of sparse array oriented approach for DOA estimation of grating lobe target filtering of the present invention, by dividing the sub-array and binarizing the angular power spectrum, the interference of grating targets is effectively avoided, and this technical solution can still ensure the accuracy of angle estimation in multi-target scenarios, compared to the conventional method of estimating the angle of a face array, this technical solution reduces the computation of angle searching, facilitates hardware implementation, and has more prominent utility.

In this specification, the present invention has been described with the reference to its specific embodiments. However, it is obvious still may be made without departing from the spirit and scope of the present invention, various modifications and transformation. Accordingly, the specification and drawings should be considered as illustrative rather than restrictive.

We claim:

1. A method of sparse array oriented approach for Direction Of Arrival (DOA) estimation of grating lobe target filtering for a radio signal received by an array antenna with a sparse layout, comprising following steps:
    (1) receiving echoes of the radio signal in multiple channels by the array antenna and dividing, by a processor, the received echoes into a plurality of sub-arrays;
    (2) performing, by the processor, digital beam formation on each sub-array obtained after the division to realize DOA estimation;
    (3) calculating, by the processor, an echo power of a beam pointing at each angle and determining a peak point from the calculated echo power;
    (4) determining a peak threshold discrimination based on the determined peak threshold;
    (5) if a current sub-array satisfies the determined peak threshold, then calculating a corresponding power spectrum extreme to obtain a final DOA estimation;
    wherein said step (1) specifically comprises:
        (1.1) forming, as a unit of row, the sub-array division in an azimuthal dimension;
        (1.2) modeling the received echoes of each array element and calculating the echoes of each channel using the following equations:

$$S_r = \begin{bmatrix} S_{r_1} & S_{r_2} & \ldots & S_{r_N} \end{bmatrix}$$

where the $S_{r_n}$ denotes each receiving channel echo, (n=1, 2 ... N), and the N is the number of receiving channels;

(1.3) processing the received echoes in each channel for wave path-difference cancellation and performing phase compensation by using a steering vector for the digital beam formation, where a two-dimensional guiding vector is expressed using the following equation:

$$\alpha(\theta, \varphi) = [1, e^{-j2\pi\phi_1(\theta, \varphi)}, \ldots, e^{-j2\pi\phi_N(\theta, \varphi)}]$$

where $\phi_{n(\theta, \varphi)}$ denotes a phase difference between the nth channel and a reference channel, (n=1, 2 ... N), the phase difference also includes azimuthal phase difference $\phi_{n_{azim}}$ and pitch phase difference $\phi_{n_{elev}}$, as follows:

$$\phi_n(\theta, \varphi) = \phi_{n_{elev}} + \phi_{n_{azim}}$$

$$\phi_{n_{azim}}(\theta, \varphi) = \frac{\Delta d_{n_x} \cos\varphi \sin\theta}{\lambda}$$

$$\phi_{n_{elev}}(\varphi) = \frac{\Delta d_{n_y} \sin\varphi}{\lambda}$$

where $\Delta d_{n_x}$ denotes an azimuthal distance between the nth channel and the reference channel, $\Delta d_{n_y}$ denotes a pitching direction distance between the nth channel and the reference channel, $\lambda$ denotes the wavelength, $\theta$ denotes an azimuth angle, and $\varphi$ denotes the pitch angle;

(1.4) completing the subarray division process;

wherein said step (3) specifically comprises:

(3.1) multiplying the steering vector by the each channel echoes to obtain the echo power of the digital beam pointing at each angle, as calculated using the following equation:

$$p_i(\theta) = \alpha^H(\theta) S_r S_r^H \alpha(\theta)$$

where i denotes the ith subarray, $p_i(\theta)$ denotes the power spectrum of the ith sub-array, $\alpha^H(\theta)$ denotes the steering vector at an azimuthal angle of $\theta$, $S_r$ denotes the echo vector, and $S_r^H$ is the conjugate transpose of $S_r$;

(3.2) normalizing and logarithmizing the power spectrum of each sub-array according to the following equation to calculate the angular power spectrum maximum and thus determine the peak threshold thr:

$$p_{i_{norm}}(\theta) = 10\log_{10}\frac{p_i(\theta)}{\max[p_i(\theta)]}$$

where $p_{i_{norm}}(\theta)$ denotes power spectrum after normalization of the ith sub-array; and once the normalized power spectrum is complete, determining the peak threshold thr according to ½ of the power maximum;

(3.3) for peak point detection of the normalized spectrogram $p_{i_{norm}}(\theta)$ for each sub-array, retaining the power $p_{i_{norm}}(\theta_{peak})$ at all peak points $\theta_{peak}$;

wherein said step (4) specifically comprises:

setting the angular power greater than or equal to said peak threshold thr to 1 and the angular power less than said peak threshold thr to 0, specifically:

$$p_{i_{binary}}(\theta) = \begin{cases} 1 & p_{i_{norm}}(\theta_{peak}) \geq thr \\ 0 & p_{i_{norm}}(\theta_{peak}) < thr \end{cases}$$

where $p_{i_{binary}}(\theta)$ denotes the binary spectrogram of the ith sub-array.

2. The sparse array oriented approach for DOA estimation of grating lobe target filtering according to claim 1, wherein said step (2) specifically comprises:

(2.1) defining the pitch direction phase difference at this point by the following equation:

$$\phi_{n_{elev}}(\varphi) = 0$$

where $\phi_{n_{elev}}(\theta)$ denotes the pitch direction phase difference between the nth channel and the reference channel when the target pitch angle is $\varphi$;

(2.2) calculating the phase difference between the n channels and the reference channel to accomplish the DOA estimation, using the following equation to calculate the phase difference:

$$\phi_n(\theta, \varphi) = \phi_{n_{azim}}(\theta) = \phi_n(\theta)$$

where $\phi_{n_{azim}}(\theta)$ denotes the azimuthal phase difference between the nth channel and the reference channel when the target azimuth is $\theta$.

3. The sparse array oriented approach for DOA estimation of grating lobe target filtering according to claim 1, wherein said step (5) comprises:

(5.1) dot-multiplying the binarized power spectrum of each sub-array set to 1 based on the following equation:

$$p_{binary}(\theta) = \prod_i p_{i_{binary}}(\theta)$$

where $p_{binary}(\theta)$ denotes the total power spectrum after dot-multiplication of the binarized power spectra of all sub-arrays;

(5.2) selecting the raw power spectrum $p_{i_{norm}}(\theta)$ of the sub-array with the highest number of array elements, and multiplying the selected raw power spectrum $p_{i_{norm}}(\theta)$ of the sub-array with the binarized power spectrum after dot-multiplied to obtain the target angular position and echo power as:

$$p(\theta) = p_{i_{norm}}(\theta) \cdot p_{binary}(\theta)$$

where $p(\theta)$ denotes the final power spectrum;

(5.3) for peak point detection for the final power spectrum $p(\theta)$, using $\theta$ corresponding to the location of the peak point as the DOA estimation output.

4. A device of sparse array oriented approach for DOA estimation of grating lobe target filtering for a radio signal received by an array antenna with a sparse layout, the device comprising:

a processor, configured to execute computer-executable instructions; and a memory, storing one or more computer-executable instructions, wherein when said computer-executable instructions are executed by said processor, the processor is caused to perform the method of sparse array oriented approach for DOA estimation of grating lobe target filtering as claimed in claim 1.

5. A processor of sparse array oriented approach for DOA estimation of grating lobe target filtering for a radio signal received by an array antenna with a sparse layout, wherein the processor is configured to execute computer-executable instructions, wherein when said processor is configured to execute computer-executable instructions, the processor is caused to perform the method of sparse array oriented approach for DOA estimation of grating lobe target filtering as claimed in claim 1.

6. A non-transitory computer-readable storage medium, wherein the non-transitory computer-readable storage medium has a computer program stored on it, said computer program is executed by a processor to cause the processor to perform the method of sparse array oriented approach for DOA estimation of grating lobe target filtering as claimed in claim 1.

\* \* \* \* \*